(12) United States Patent  (10) Patent No.: US 6,987,244 B2
Bauer  (45) Date of Patent: Jan. 17, 2006

(54) SELF-CONTAINED LOCKING TRIGGER ASSEMBLY AND SYSTEMS WHICH INCORPORATE THE ASSEMBLY

(75) Inventor: Gregory W. Bauer, Wilmington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 119 days.

(21) Appl. No.: 10/284,720

(22) Filed: Oct. 31, 2002

(65) Prior Publication Data

US 2004/0020910 A1  Feb. 5, 2004

Related U.S. Application Data

(63) Continuation-in-part of application No. 10/210,638, filed on Jul. 31, 2002.

(51) Int. Cl.
*B23K 9/00* (2006.01)

(52) U.S. Cl. .......................... 219/137.31; 219/137.42; 200/43.17

(58) Field of Classification Search ................ 219/132, 219/139, 137.31, 137.63, 137.42, 137.62, 219/138; 200/43.17, 318.2, 321
See application file for complete search history.

(56) References Cited

U.S. PATENT DOCUMENTS

| | | | | |
|---|---|---|---|---|
| 4,250,366 A | * | 2/1981 | Erickson et al. | 200/332.2 |
| 4,731,518 A | * | 3/1988 | Parmelee et al. | 219/137.31 |
| 5,260,546 A | * | 11/1993 | Ingwersen et al. | 219/137.31 |
| 5,383,875 A | * | 1/1995 | Bays et al. | 606/1 |
| 5,638,945 A | * | 6/1997 | Fukinuki et al. | 200/43.17 |
| 5,698,122 A | * | 12/1997 | Lubieniecki et al. | 219/137.31 |
| 6,025,574 A | * | 2/2000 | Colangelo, Jr. | 219/137.31 |
| 6,057,518 A | * | 5/2000 | Bascom et al. | 200/43.17 |

* cited by examiner

*Primary Examiner*—Kiley S. Stoner
*Assistant Examiner*—Len Tran
(74) *Attorney, Agent, or Firm*—Fletcher Yoder

(57) ABSTRACT

A welding system having a welding implement with a self-contained trigger and trigger locking assembly. The self-contained trigger and trigger locking assembly has a trigger which, when operated, regulates the flow of current from a power source. The trigger lock of the assembly has a movable portion which includes a groove which can engage a complementary structure on the trigger to maintain the trigger in an operating position, thereby allowing continued flow of current from the power source.

34 Claims, 6 Drawing Sheets

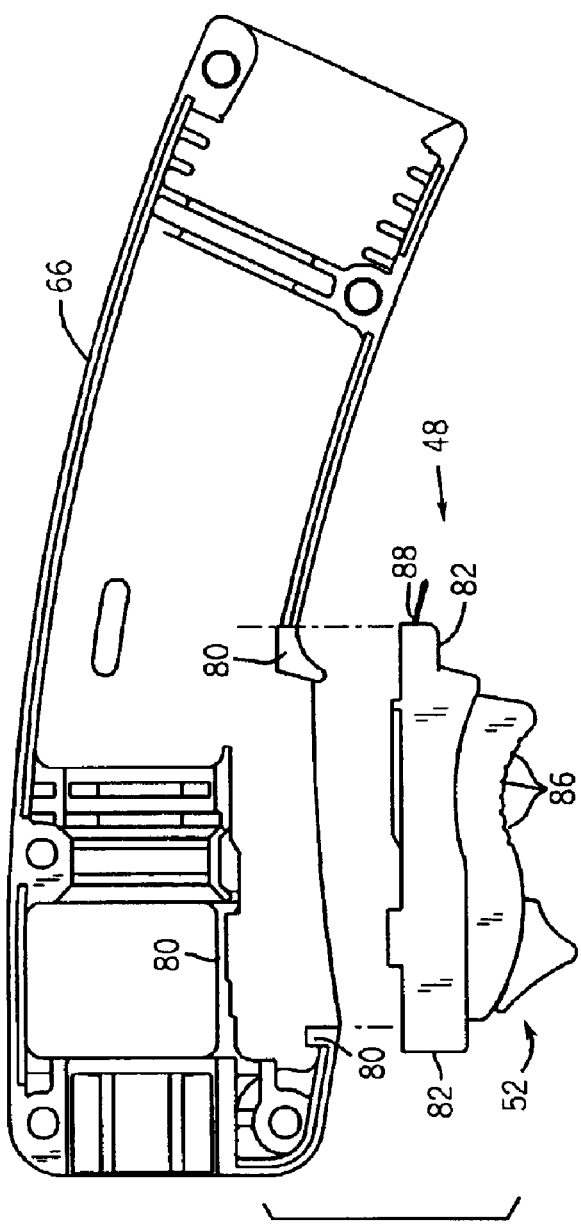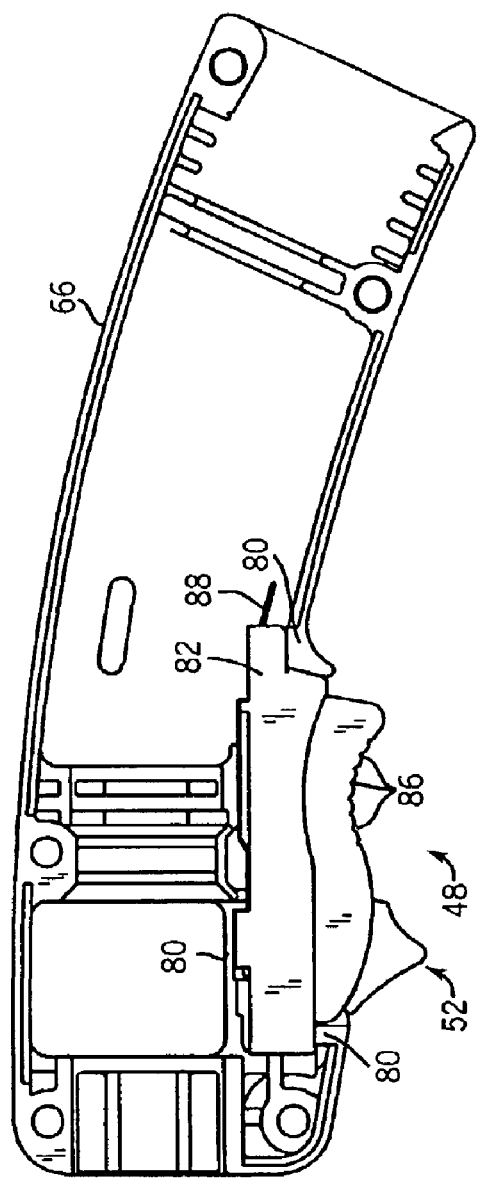
FIG. 4
FIG. 5

SELF-CONTAINED LOCKING TRIGGER ASSEMBLY AND SYSTEMS WHICH INCORPORATE THE ASSEMBLY

CROSS REFERENCE TO RELATED APPLICATIONS

This patent application is a continuation-in-part of patent application Ser. No. 10/210,638, filed Jul. 31, 2002, entitled, "Welding System Having Welding Gun With Self-Contained Locking Trigger."

BACKGROUND OF THE INVENTION

The present invention relates generally to welding systems, and particularly to a welding system having a welding implement coupled to a source of electric power. In particular, one aspect of the present invention relates to a self-contained trigger and trigger lock assembly which may be incorporated into a welding implement Welding is a method of joining pieces of metal together into one solid piece. Welding implements are used in a number of different types of welding. For example, welding implements are typically used in arc welding. An arc welding system typically comprises an electric power supply coupled to a welding implement that houses an electrode. The electric power supply typically includes a conductive cable and a clamp for securing the conductive cable to the metal piece to be welded. The electrode in the welding handle, along with the metal piece and conductive cable, completes an electrical circuit with the power supply when the electrode is placed against the metal piece. The contact between the electrode and the metal piece produces an electric arc between the electrode and the metal piece. The heat of the electric arc is concentrated on the metal piece, or pieces, to be joined. The heat of the arc causes the metal piece, or pieces, to melt. A filler material may be added to the molten metal. The molten mass cools and solidifies when the arc is removed, forming the weld.

MIG (Metal Inert Gas) welding is one type of arc welding. MIG welding is also referred to as "wire-feed" or GMAW (Gas Metal Arc Welding). In MIG welding, a metal wire is used as the electrode to produce the arc. The wire is shielded by an inert gas and the metal wire acts as the filler for the weld. The inert gas is used to shield the electric arc from outside contaminants and gases that may react with the weld. Non-inert gases, such as $CO_2$, also are used in MIG welding. Typically, the wire and gas are fed through a hand-held welding implement. The wire and gas are fed to the welding implement from a welding system having a wire feeder, a power source, and a source of gas, such as a gas cylinder. The welding implement, typically, has a switch, or trigger, that is coupled to the rest of the system. When the trigger is operated, gas and wire are fed through the handle and power is applied to the wire. Typically, triggers have a spring that is used to bias the trigger to a disengaged position. The force of the spring must be overcome to operate the trigger.

Submerged arc welding is another type of arc welding method. In submerged arc welding, a wire feeder also is used to feed electrode wire through a welding implement. However, in submerged arc welding, a granular flux, rather than a gas, is used. In submerged arc welding, the point of metal fusion and the arc are submerged within the flux. The flux is a granular composition of chemical and metallic materials that shields the arc. The granular flux is continuously deposited by the welding implement just ahead of the electrode. The electrical current melts the electrode to form the weld puddle. The portion of the flux that is adjacent to the electrode tip and the puddle melts, forming a slag layer that refines the weld and excludes air. The wire and flux also are fed through a welding implement. The welding handle for a submerged arc welding system also, typically, has a switch, or trigger, that is coupled to a welding system. When the trigger is operated, the flux and the wire are fed through the welding implement and power is applied to the wire.

Trigger locks have been developed to maintain a trigger in an engaged position so that a user does not have to squeeze the trigger against spring force for an extended period of time. Currently, triggers and trigger locks are composed of numerous pieces that are adapted to cooperate with portions of the welding handle. For example, a typical trigger is used to operate a switch that is electrically coupled to the other components of the system, such as the power source. The switch is fixed in place in the handle and the trigger is fixed to the handle so that it can pivot relative to the handle to operate the switch. A typical trigger lock may have a stem, such as a pin, that extends through the trigger into a portion of the handle to maintain the trigger pivoted.

Assembling the trigger and trigger lock pieces together with the handle may be time-consuming. For example, to assemble the welding implement, the trigger and stem must be positioned in the welding handle so that the locking stem will be able to align with the hole in the welding handle. In addition, supplies of each of the parts must be maintained at the assembly area during assembly. Additionally, all of the parts must be tracked during disassembly to prevent a part from being lost. Additionally, the more the various individual pieces are required to cooperate, the greater the possibility of failure of the trigger and trigger lock.

There exists then a need for a welding system that utilizes a welding implement having fewer pieces for assembly. Additionally, there is a need for a trigger and trigger lock that has all of the components contained in a single device and which does not need to cooperate with portions of a welding handle to lock the trigger in a desired position.

BRIEF DESCRIPTION OF THE DRAWINGS

The invention will hereafter be described with reference to the accompanying drawings, wherein like reference numerals denote like elements, and:

FIGS. 4 and 5 are front elevational views illustrating the installation of a self-contained trigger and trigger locking apparatus in the welding gun, according to one embodiment of the present technique;

DETAILED DESCRIPTION OF THE PREFERRED EMBODIMENTS

Figure 1:
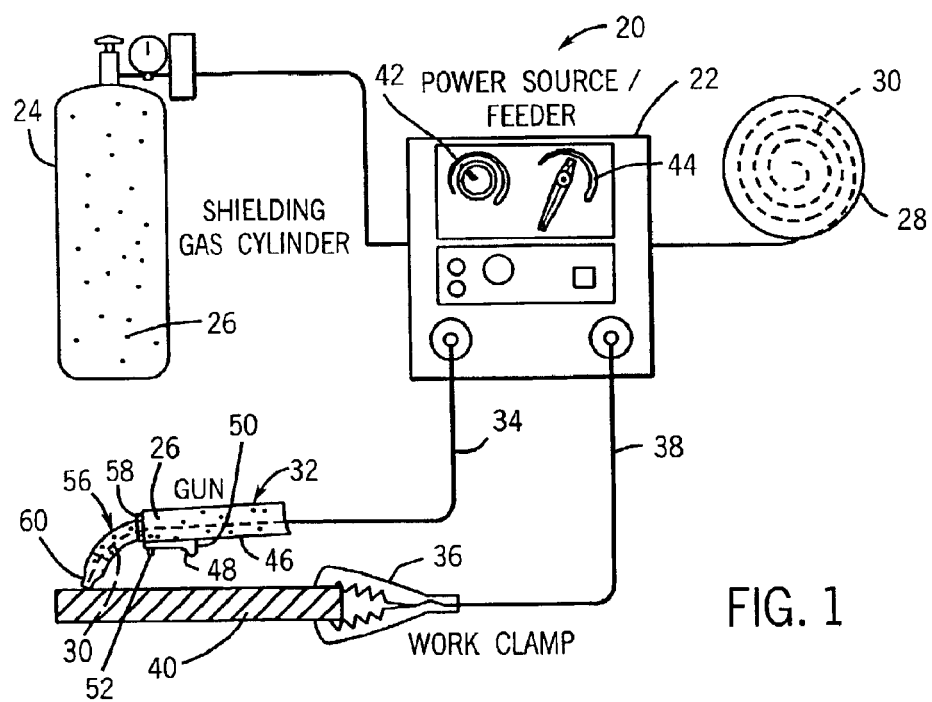
FIG. 1 is a diagram of a MIG welding system, according to one embodiment of the present technique.

Referring generally to FIG. 1, an exemplary metal inert gas ("MIG") welding system 20 is illustrated. However, the present technique is operable with other types of welding systems, such as submerged arc welding systems. The illustrated welding system 20 comprises a power source/wire feeder 22, a gas cylinder 24 containing a gas 26 that is coupled to the power source/wire feeder 22, a spool 28 of electrode wire 30 that is coupled to the power source/wire feeder, a welding gun 32 having a welding cable 34, a work clamp 36, and a ground cable 38. However, the present techniques are applicable to welding implements other than a welding gun. In the illustrated embodiment, the power source and wire feeder are combined. However, the power source and wire feeder may also be provided as separate welding devices.

The power source/wire feeder 22 provides electric power to the welding gun 32 via the welding cable 34. Additionally, the power source/wire feeder 22 directs the feeding of gas 26 and wire 30 to the welding cable 34. The welding cable 34 is operable to route the gas 26 and the wire 30 to the welding gun 32. The work clamp 36 is clamped onto the conductive workpiece 40 to be welded. The work clamp 36 and a ground cable 38 electrically couple the power source/wire feeder 22 to a workpiece 40. Additionally, the wire 30 within the welding cable 34 is electrically coupled to the power source/wire feeder 22.

In this embodiment, the welding gun 32 is used to direct the wire 30 and gas 26 toward the workpiece 40 and to control the feeding of wire 30 from the power source/wire feeder 22 to the workpiece 40. However, the welding gun 32 may be operable to control more or less functions of the welding system. When the wire is touched to the workpiece 40, the electrical circuit is completed. Electricity from the power source/wire feeder 22 flows through the wire 30 and workpiece 40, producing an arc. The electric arc produces heat that melts the workpiece 40 in a region surrounding the point of contact between the wire 30 and the workpiece 40. The wire also acts as filler material. The heat of the arc melts the wire 30 along with the workpiece 40. The inert gas 26 forms a shield that prevents harmful chemical reactions from occurring at the weld site. When the arc is removed, the workpiece 40 and the filler material solidify, forming the weld.

The power source/wire feeder 22 may have a variety of different features. For example, in the illustrated embodiment, the power source/wire feeder 22 has a wire speed control 42 to enable a user to control the speed at which wire 30 is fed from the power source/wire feeder 22. Additionally, the illustrated power source/wire feeder 22 has a variable voltage control 44 to enable a user to control the voltage produced by the power source/wire feeder 22.

Figure 2:
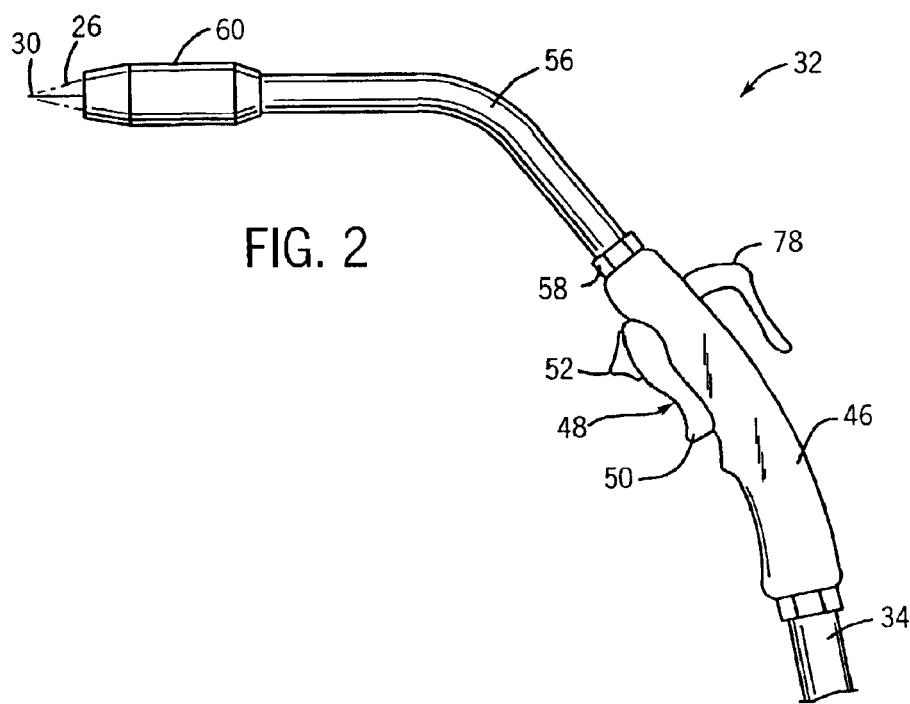
FIG. 2 is a front elevational view of a welding gun configured for use in the welding system of FIG. 1.
Figure 3:
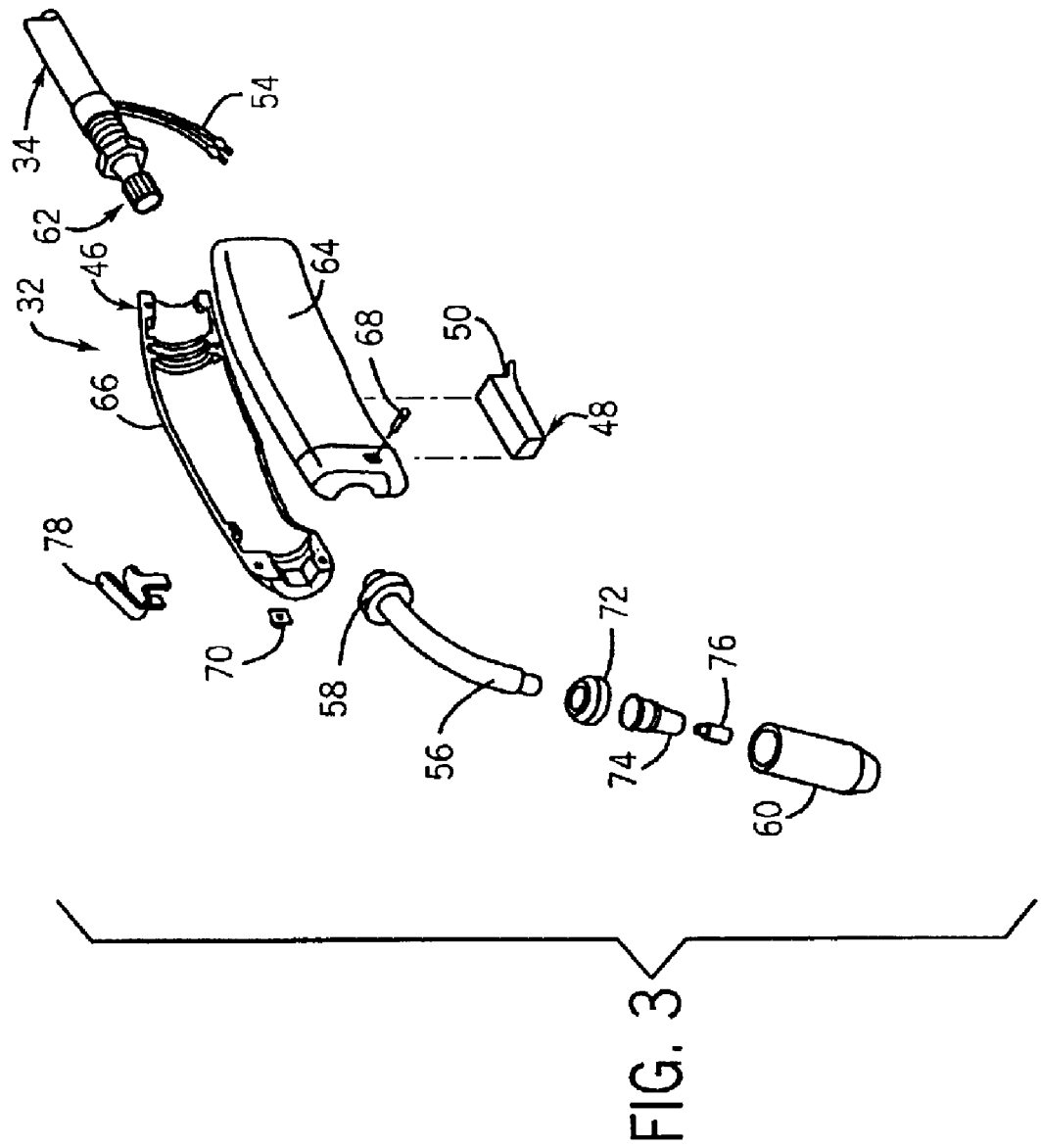
FIG. 3 is an exploded view of a welding gun configured for use in the welding system of FIG. 1.

Referring generally to FIGS. 2 and 3, the welding gun 32 comprises a handle 46 and a self-contained trigger and trigger lock assembly 48. The self-contained trigger and trigger lock assembly 48 has a trigger 50 and a trigger lock 52. As best illustrated in FIG. 3, the welding cable 34 has control wires 54 that are connected to the self-contained trigger and trigger lock assembly 48. In the illustrated embodiment, the trigger 50 enables a user to control the supply of gas 26, wire 30 and power from the power source/wire feeder 22. However, in other embodiments, the trigger 50 may be operable to control more or less functions of the power source/wire feeder and other welding devices. The self-contained trigger and trigger lock assembly 48 is adapted to enable the trigger lock 52 to lock the trigger 50 in a desired position without having to cooperate with an external member, such as the handle 46.

In the illustrated embodiment, the trigger 50 is operated by squeezing the trigger 50 towards the handle 46. A number of events occur when the trigger 50 is operated. One event is that an electrical signal is sent from the trigger 50 to the power source/wire feeder 22 through the control wires 54. The power source/wire feeder 22 is directed to draw in wire 30 from the wire spool 28 and feed it though the welding cable 34 to the welding gun 32. Additionally, gas 26 from the gas cylinder 24 flows through the welding cable 34 to the welding gun 32. Also, electric power from the power source/wire feeder 22 is supplied to the wire 30. When activated, the trigger lock 52 maintains the trigger 50 engaged, keeping gas 26 and wire 30 flowing. The welding gun 32 also has a neck 56. The neck 56 is secured to the welding handle 46 by a retainer nut 58. The wire 30 and gas 26 are then fed through the neck 56 towards the workpiece 40. A nozzle 60 directs the wire 30 and gas 26 from the neck 56 towards the workpiece 40. When the trigger 50 is released, gas 26, wire 30, and electrical power are no longer fed to the welding gun 32.

Referring generally to FIG. 3, the welding cable 34 has a connector assembly 62 to couple the welding cable 34 to the welding gun 32. In the illustrated embodiment, the welding handle 46 is comprised of a left handle portion 64 and a right handle portion 66. The left and right handle portions are secured to each other by a screw 68 and a nut 70. The welding handle 46 also comprises an insulator 72, a diffuser 74, and a tip 76. In the illustrated embodiment, the insulator 72, a diffuser 74, and tip 76 are housed within the nozzle 60. The tip 76 is used to direct the wire 30 towards the workpiece 40. The insulator 72 is used to prevent electricity in the wire 30 from flowing through the neck 56 to the welding handle 46, shocking the user. The diffuser 74 is used to establish the desired flow characteristics of the gas 26, e.g., pressure. The nozzle 60 is used to direct the gas 26 to the workpiece 40. Additionally, the illustrated welding handle 46 has a hook 78 that may be used to hang the welding gun 32 from a mounting hook.

Referring generally to FIGS. 3, 4, and 5, the left and right welding handle portions are adapted to secure the self-contained trigger and trigger locking assembly 48 to the welding gun 32. As best illustrated in FIGS. 4 and 5, the right handle portion 66 has guide portions 80 that are adapted to receive the self-contained trigger and trigger locking assembly 48. The left handle portion 64 also has guide portions 80 (not shown). During assembly, the self-contained trigger and trigger locking assembly 48 is placed within the guide portions 80 of either the left or right handle portions. When the left and right handle portions are secured together, the guide portions 80 contact fixed portions 82 of the self-contained trigger and trigger locking assembly 48, securing the self-contained trigger and trigger locking assembly 48 in place within the welding gun 32. The trigger 50 and trigger lock 52 of the self-contained trigger and trigger locking assembly 48 are adapted to cooperate with the fixed portions 82 of the self-contained trigger and trigger locking assembly 48, rather than the handle portions, to pivot the trigger 50 and lock the trigger 50 in a desired position. Thus, the trigger and trigger lock assembly 48 is self-contained.

Figure 6:
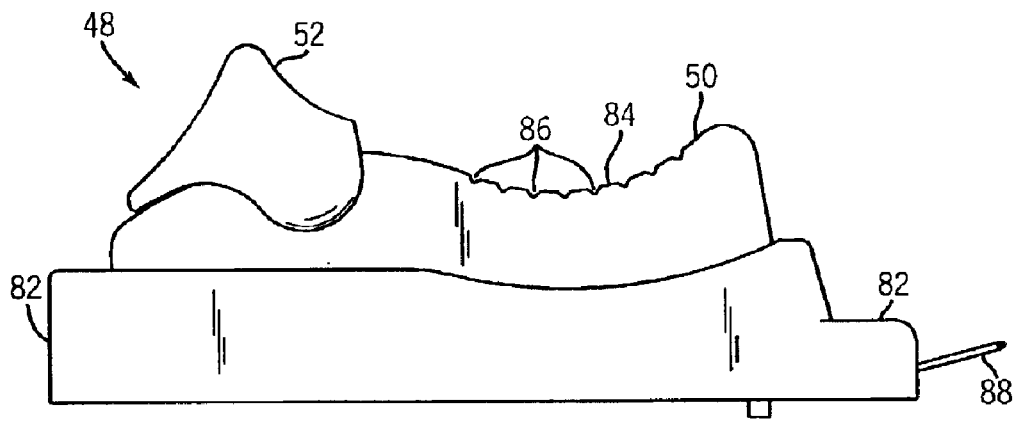
FIG. 6 is a front elevational view illustrating the trigger and trigger lock assembly.

Referring generally to FIG. 6, the self-contained trigger and trigger locking assembly 48 is illustrated with the trigger 50 in a relaxed, or disengaged, position. The self-contained trigger and trigger locking assembly 48 includes the trigger 50 and the trigger lock 52, here embodied as a sliding switch affixed at one end of the trigger 52 such that the trigger lock 52 may be engaged by the index finger of an operator when in use. The illustrated embodiment of the trigger 50 has a curved portion 84 and ribs 86 to enable the trigger 50 to be gripped and operated easily. The self-contained trigger and trigger locking assembly 48 also include conductive prongs 88 extending out from the fixed portion 82 of the assembly.

Figure 7:
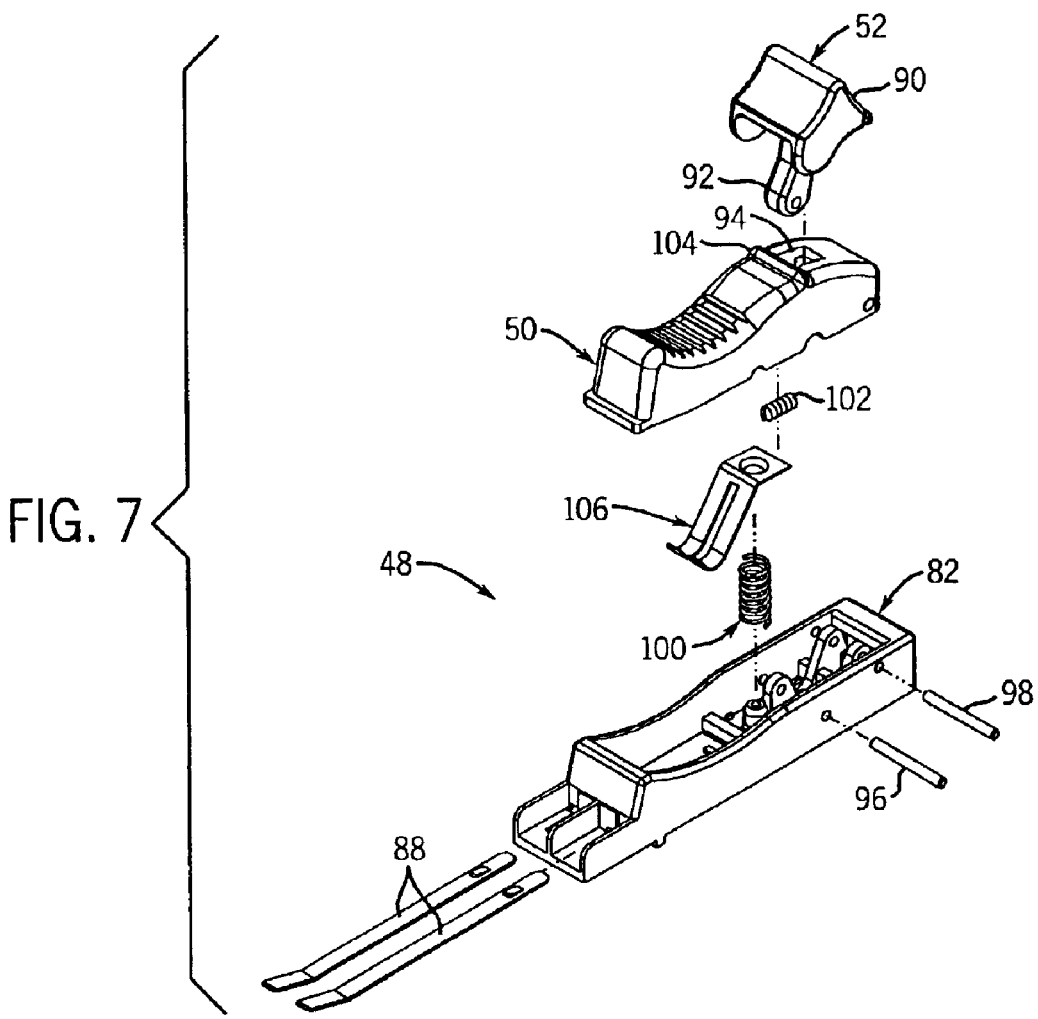
FIG. 7 is an exploded view of one example of a trigger and trigger lock assembly in accordance with the present technique.

The self-contained trigger and trigger locking assembly 48 can be seen in exploded detail in FIG. 7. In particular, it can be seen that the illustrated trigger lock 52 includes an exterior slider 90 that is used to engage the trigger lock 52. The exterior slider 90 is connected to a locking lever 92. The locking lever 92 extends through a guide 94 in the trigger 50. The locking lever 92 passes through the guide 94 and is pivotally secured to the interior of the fixed portion 82 by a trigger lock roll pin 96. Similarly, the trigger 50 is pivotally secured to the interior of the fixed portion 82 by a trigger roll pin 98. A trigger spring 100 is positioned between the trigger 50 and the fixed portion 82 and acts to bias the trigger 50 upward absent the application of an external force by an operator. Likewise a trigger lock spring 102 is positioned between the trigger 50 and the locking lever 92 and acts to bias the trigger lock 52 to a disengaged position absent the application of an external force by the operator. When, however, an external force is applied by the operator to overcome the force of the trigger lock spring 102, the trigger lock 52 may be slid over and held by a locking notch 104 disposed on the surface of the trigger 50 as discussed in greater detail below.

During operation, the trigger 50 is squeezed, pivoting the trigger 50 toward the fixed portion 82. When the trigger 50 is pivoted a sufficient amount, a contact terminal 106 disposed between the trigger 50 and the interior of the fixed portion 82 engages the conductive prongs 88, changing the electrical resistance between the prongs. For example, the electrical resistance may be approximately zero ohms when the contact terminal 106 is engaged with the prongs 88 but essentially infinite when the contact terminal 106 is not engaged with the prongs 88. The change in resistance produces an electrical signal that is transmitted through the control wires 54 to the power source/wire feeder 22. When the trigger 50 is not depressed however, the biasing force of the trigger spring 100 prevents the contact terminal 106 from contacting the prongs 88.

Figure 8:
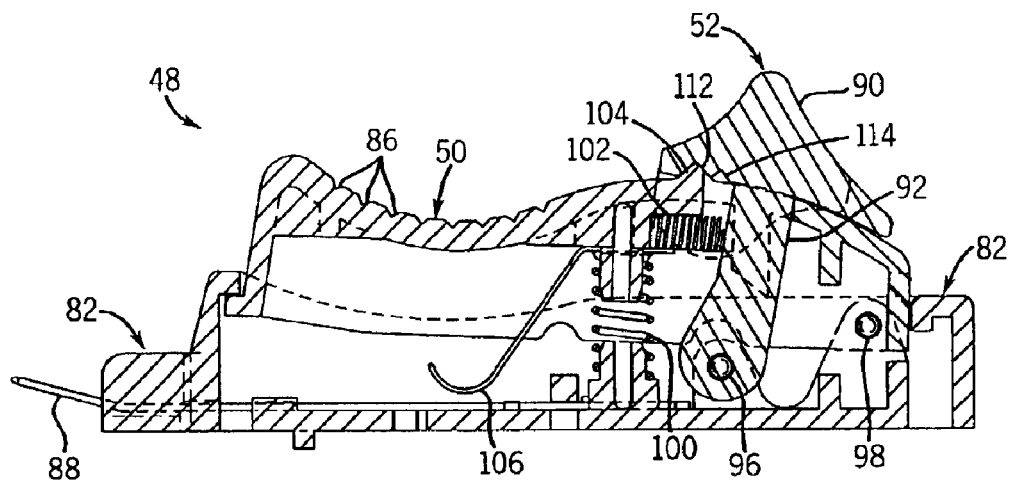
FIG. 8 is a cross-sectional view of the self-contained trigger and trigger locking apparatus of FIG. 6.
Figure 9:
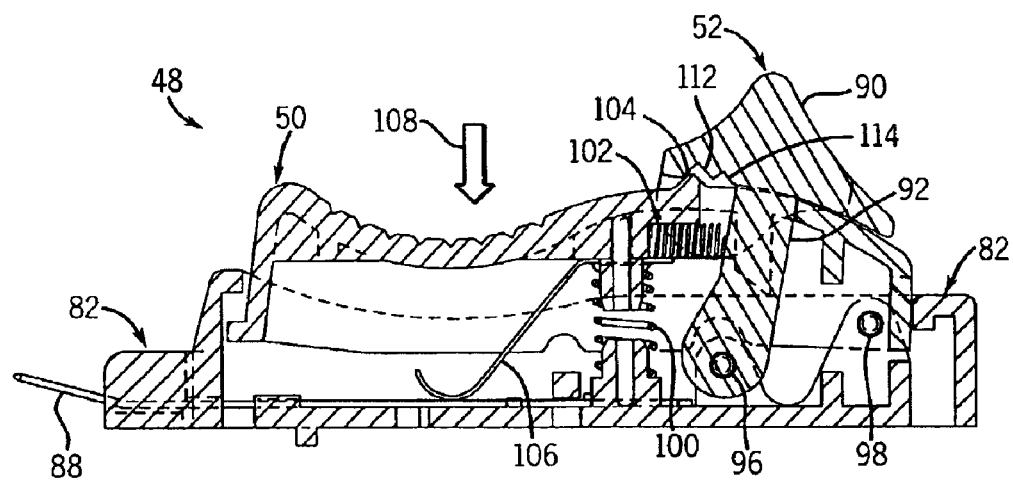
FIG. 9 is a cross-sectional view of the self-contained trigger and trigger locking apparatus, illustrating the trigger in an engaged position and the trigger lock being in a disengaged position.
Figure 10:
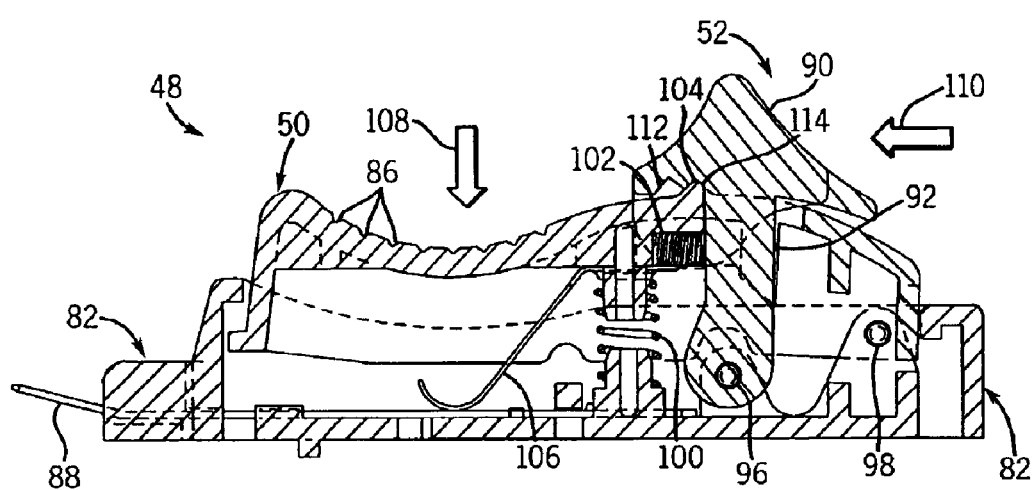
FIG. 10 is a cross-sectional view of the self-contained trigger and trigger locking apparatus, illustrating the trigger and trigger lock in an engaged positions.

Further illustration of the operation of self-contained trigger and trigger locking assembly 48 is provided with reference to FIGS. 8–10. Referring to FIG. 8, the assembly is depicted in a disengaged and unlocked state. In this state, no substantial inward force is directed to the trigger 50 which would operate against the biasing force of the trigger spring 100 to depress the trigger 50. As a result, the contact terminal 106 is not in contact with the prongs 88. Likewise, in this state, the trigger lock 52 is held in an unlocked position by the biasing force of trigger lock spring 102 against the locking lever 92.

In FIG. 9, however, an operating force 108 is applied to the trigger 50, causing the trigger 50 to pivot toward around the trigger roll bar 98 toward the fixed portion 82. As the trigger 50 pivots, the contact terminal 106 contacts the prongs 88, altering the electrical resistance between them and generating control signals which are transmitted via the control wires 54 to the power source/wire feeder 22.

Referring generally to FIG. 10, the trigger lock 52 may be operated after the trigger 50 has been depressed to maintain the trigger 50 depressed or the trigger lock 52 may be operated to depress the trigger 50, such that the contact terminal 106 engages the prongs 88. In the example depicted, operation of the trigger lock 52 may be initiated by a locking force 110 applied to one face of the exterior slider 90 which acts in opposition to the biasing force provided by the trigger lock spring 102. Though the locking force 110 is directed toward the trigger 50 in the depicted example, by changing the position of the trigger lock spring 102 or the nature of the biasing force within the assembly 48, the trigger lock 52 may be adapted to be operated by applying a force in a direction away from, or perpendicular to, the trigger 50.

In FIG. 10, the locking force 110 overcomes the biasing force produced by the trigger lock spring 102, allowing the trigger lock 52 to pivot around the trigger lock roll pin 96 toward an engaged position. The pivoting motion of the trigger lock 52 bring the trigger lock 52 into engagement with the locking notch 104. In particular, when the trigger lock 52 is pivoted to a locked position, a locking groove 114 may engage the locking notch 104 such that, when the locking force 110 and the operating force 108 are discontinued, the biasing forces produced by trigger spring 100 and trigger lock spring 102 are insufficient to disengage the locking groove 114 from the locking notch 104. Because the biasing forces are insufficient to disengage the locking groove 114 from the locking notch 104, the trigger 50 is not biased upward by the trigger spring 50 and the terminal contact 106 remains in contact with the prongs 88. A control signal to the power source/wire feeder 22 is therefore maintained while the trigger lock 52 is in a locked state.

Though a complementary notch 104 and groove 114 are discussed, it should be understood that equivalent complementary arrangements are also envisioned and encompassed. For example, a peg and hole arrangement or a hook and catch arrangement are also feasible complementary structures. In addition, the placement of the complementary structures may be alternated, i.e. in the present example, the locking notch 104 might be disposed upon the trigger lock 52 and the locking groove 114 on the trigger, as long as some engagement of complementary structures can be accomplished to engage the trigger lock 52 with the trigger 50.

Returning to the FIG. 10, in addition to the locking groove 114, an unlocked groove 112 may also be present on the trigger lock 52 which is engaged with the locking notch 104 when the trigger 50 is not depressed or prior to application of the locking force 110. The unlocked groove 112 is adapted to impede the movement of the trigger lock 52 in the absence of an operating force 108. In the presence of an operating force 108, however, the configuration of the trigger lock 52 relative to the trigger 50 changes, thereby reducing the degree of resistance to movement produced by the engagement of the locking notch 104 and the unlocked groove 112. Once an operating force 108 is applied therefore, a subsequent locking force 110 may more easily pivot the trigger lock 52 from an engagement between the unlocked groove 112 and the locking notch 104 to an engagement between the locking groove 114 and the locking notch 104. Alternately, the unlocked groove 112 may be absent and the trigger lock 52 may be freely rotatable in the presence of the operating force 108 and the locking force 110. Regardless, once the locking groove 114 and the locking notch 104 are engaged, the engagement may act to counter the biasing forces produced by the trigger spring 100 and the trigger lock spring 102, holding the contact terminal 106 in contact with the prongs 88.

To disengage the trigger lock 52, the operator again applies an operating force 108 by squeezing the trigger 50 toward the fixed portion 82. This removes the locking notch 108 out of the locking groove 114, allowing the biasing force of the trigger lock spring 102 to move the trigger lock 52 to an unlocked position. Alternately, if squeezing the trigger 50 does not sufficiently remove the locking notch 104 from the locking groove 114 to allow the trigger lock spring 102 to disengage the trigger lock 52, the operator may apply a force to the exterior slider 90 in the direction of the biasing force to overcome any remaining resistance and unlock the trigger lock 52. After unlocking the trigger lock 52, the user may continue operation of the welding system 20 by continuing to squeeze the trigger 50 or a user may release the trigger 50 to discontinue operation of the welding system 20.

It will be understood that the foregoing description is of preferred exemplary embodiments of this invention, and that the invention is not limited to the specific forms shown. For example, the self-contained trigger and trigger locking assembly may be used in a variety of different welding systems. Additionally, the trigger may be shaped in a variety of different shapes. Furthermore, the trigger may make or break an electrical connection between the prongs of the self-contained trigger and trigger locking assembly using other circuitry or conductive means. These and other modifications may be made in the design and arrangement of the elements without departing from the scope of the invention as expressed in the appended claims.

What is claimed is:

1. An arc welding system, comprising:
   an electric power source; and
   a welding implement electrically coupleable to the electric power source, comprising:
      a handle; and
      a self-contained trigger and trigger lock assembly operably coupled to the handle, comprising:
         a trigger which possesses at least two states, wherein each state allows a different amount of an electric current to flow between the electric power source and the welding implement; and
         a trigger lock pivotably coupled to the trigger, wherein the trigger lock, when locked, prevents the trigger from changing states.

2. The system as recited in claim 1, wherein the trigger possesses an on-state allowing current to flow to the welding implement and an off-state preventing current from flowing to the welding implement.

3. The system as recited in claim 1, wherein the self-contained trigger and trigger lock assembly further comprises a conductive terminal that completes a circuit when the trigger is in a first state but does not complete the circuit when the trigger is in a second state.

4. The system as recited in claim 1, wherein the handle comprises a plurality of handle pieces, wherein the plurality of handle pieces and a fixed portion of the self-contained trigger and trigger lock are conformably configured such that the plurality of handle pieces secure the fixed portion of the self-contained trigger and trigger lock assembly when the handle is assembled together.

5. The system as recited in claim 1, wherein the trigger lock is configured to engage with a locking structure disposed on the trigger when the trigger is operated such that, when the trigger lock engages with the locking structure, the trigger lock is locked.

6. The system as recited in claim 5, wherein the locking structure comprises at least one of a notch, a groove, a peg, a hole, a hook, and a catch.

7. The system as recited in claim 5, wherein the trigger lock comprises a complementary structure configured to engage complementary with the locking structure, wherein the complementary structure comprises at least one of a notch, a groove, a peg, a hole, a hook, and a catch.

8. A welding system, comprising:
   a welding device;
   a welding implement electrically coupleable to the wire-feed welding device, the welding implement comprising a handle configured to securely receive a separable locking trigger assembly, wherein the separable locking trigger assembly comprises:
      an attachment portion configured to be securely receivable by the handle for securing the locking trigger assembly to the handle;
      a trigger that is pivotably secured to the attachment portion, wherein at least one operation of the welding system is controllable by the position of the trigger; and
      a trigger lock that is pivotably secured to the attachment portion to maintain the trigger in a desired position.

9. The system as recited in claim 8, wherein the trigger lock comprises a movable portion connected to a locking lever pivotably secured to the attachment portion, wherein the movable portion comprises a locking structure configured to engage a complementary structure disposed on the trigger such that engagement of the locking structure and the complementary structure restricts movement of the trigger.

10. The system as recited in claim 9, comprising a trigger spring to bias the trigger relative to the attachment portion such that the trigger is in a first position in the absence of an external applied force.

11. The system as recited in claim 9, comprising a trigger lock spring to bias the trigger lock relative to the trigger such that the trigger lock is unlocked in the absence of a locking force, wherein the locking force includes at least one of a force applied by a user and a resistance generated by engagement of the locking structure and the complementary structure.

12. The system as recited in claim 8, wherein the welding device comprises a wire feeder, the at least one operation of the welding system being directing the wire feeder to feed electrode wire from the wire feeder.

13. The system as recited in claim 8, wherein the welding device comprises a power source, the at least one operation of the welding system being directing the power source to apply power to the welding implement.

14. A welding implement, comprising:
   a handle coupled to the nozzle, wherein the handle is configured to securely receive a self-contained trigger and trigger lock assembly operable to be electrically coupled to a power source, wherein the self-contained trigger and trigger lock assembly comprises:
      an attachment portion configured to be securely receivable by the handle;
      a trigger pivotably secured to the attachment portion, wherein the position of the trigger is configured to direct a flow of a current from the power source to the nozzle; and
      a trigger lock pivotably operable to secure the trigger in a desired position to maintain the power source in a desired state of operation.

15. The welding implement as recited in claim 14, comprising a trigger lock spring which biases the trigger lock in an unlocked position in the absence of a locking force, wherein the locking force comprises at least one of a force supplied by an operator and a resistance created by the engagement of a locking region on the trigger lock and a complementary region on the trigger.

16. The welding implement as recited in claim 15, wherein the locking region comprises at least one of a protuberance, an indentation, a hole, a hook, and a catch.

17. The welding implement as recited in claim 15, wherein the complementary region comprises at least one of a protuberance, an indentation, a hole, a hook, and a catch.

18. The welding implement as recited in claim 14, wherein the self-contained trigger and trigger lock assembly comprises an electrical connector operably coupled to the trigger, wherein the electrical connector is configured to complete an electric circuit when the trigger is operated.

19. The welding implement as recited in claim 14, wherein the welding implement comprises a plurality of handle pieces that are assembled together to form the handle, wherein the plurality of handle pieces and the attachment portion of the self-contained trigger and trigger locking assembly are adapted such that the plurality of handle pieces secure the self-contained trigger and trigger locking assembly when the handle is assembled.

20. The welding implement as recited in claim 14, wherein the welding implement is coupleable to a welding cable adapted to convey electrode wire from a wire feeder, wherein the trigger also controls electrode wire flow from the wire feeder.

21. The welding implement as recited in claim 20, wherein the welding cable is adapted to convey gas from a supply of gas, wherein the trigger also controls gas flow from the supply of gas.

22. A welding implement kit, comprising:
a self-contained trigger and trigger locking assembly comprising:
a base securable to a welding implement;
a trigger coupled to the base and positionable relative to the base; and
a trigger lock pivotably positionable relative to the base and adapted to selectively lock the trigger in a desired position relative to the base.

23. The welding implement kit as recited in claim 22, wherein the trigger lock is pivotably secured to the base.

24. The welding implement kit as recited in claim 23, wherein the trigger is pivotably secured to the base.

25. The welding implement kit as recited in claim 24, wherein the trigger lock comprises a first portion and the trigger comprises a second portion, the first and second portions being adapted to cooperate to obstruct movement of the trigger and trigger lock when the trigger lock is pivoted to a locking position relative to the trigger.

26. The welding implement kit as recited in claim 25, wherein the trigger lock is released from the locked position by pivoting the trigger towards the base.

27. The welding implement kit as recited in claim 26, comprising a spring adapted to pivot the trigger lock toward an unlocked position when the trigger is pivoted towards the base.

28. The welding implement kit as recited in claim 22, comprising a plurality of handle pieces adapted to secure the base therebetween when the plurality of handle pieces are secured to each other.

29. The welding implement kit as recited in claim 22, wherein the self-contained trigger and trigger locking assembly comprises an electrical circuit and a conductive connector coupled to the trigger such that the position of the trigger determines whether the conductive connector closes the electric circuit, wherein the electrical circuit is configured to connect to a corresponding electrical connector in a welding cable.

30. A method of operating a welding system, comprising the acts of:
activating a welding implement by operating a spring-biased trigger of a self-contained trigger and trigger locking assembly;
pivoting a spring-biased trigger lock of the self-contained trigger and trigger locking assembly such that a locking region of the trigger lock engages a complementary region of the trigger; and
releasing the spring-biased trigger, wherein resistance created by the engagement of the locking region and the complementary region maintains operation of the welding system.

31. The method as recited in claim 26, wherein pivoting comprises using a finger to provide a force in opposition to a spring biasing the trigger lock.

32. The method as recited in claim 31, further comprising the act of unlocking the spring-biased trigger by operating the spring-biased trigger such that the locking region and the complementary region may be disengaged.

33. The method as recited in claim 32, wherein the locking region and the complementary region are disengaged by an unlocking force produced by at least one of a spring biasing the trigger lock and a force applied by an operator in the direction of the bias produced by the spring.

34. A method of assembling the handle of a welding implement, comprising the acts of:
disposing a self-contained trigger and trigger lock within a first handle piece configured to receive the self-contained trigger and trigger lock wherein the trigger lock is pivotably coupled to a trigger; and
joining a second handle piece configured to receive the self-contained trigger and trigger lock to the first handle piece, such that the self-contained trigger and trigger lock is securely held between the first and second handle pieces.

* * * * *